Nov. 16, 1948.    L. C. ZIMMERMANN    2,454,023
CONVEYER
Filed March 23, 1945
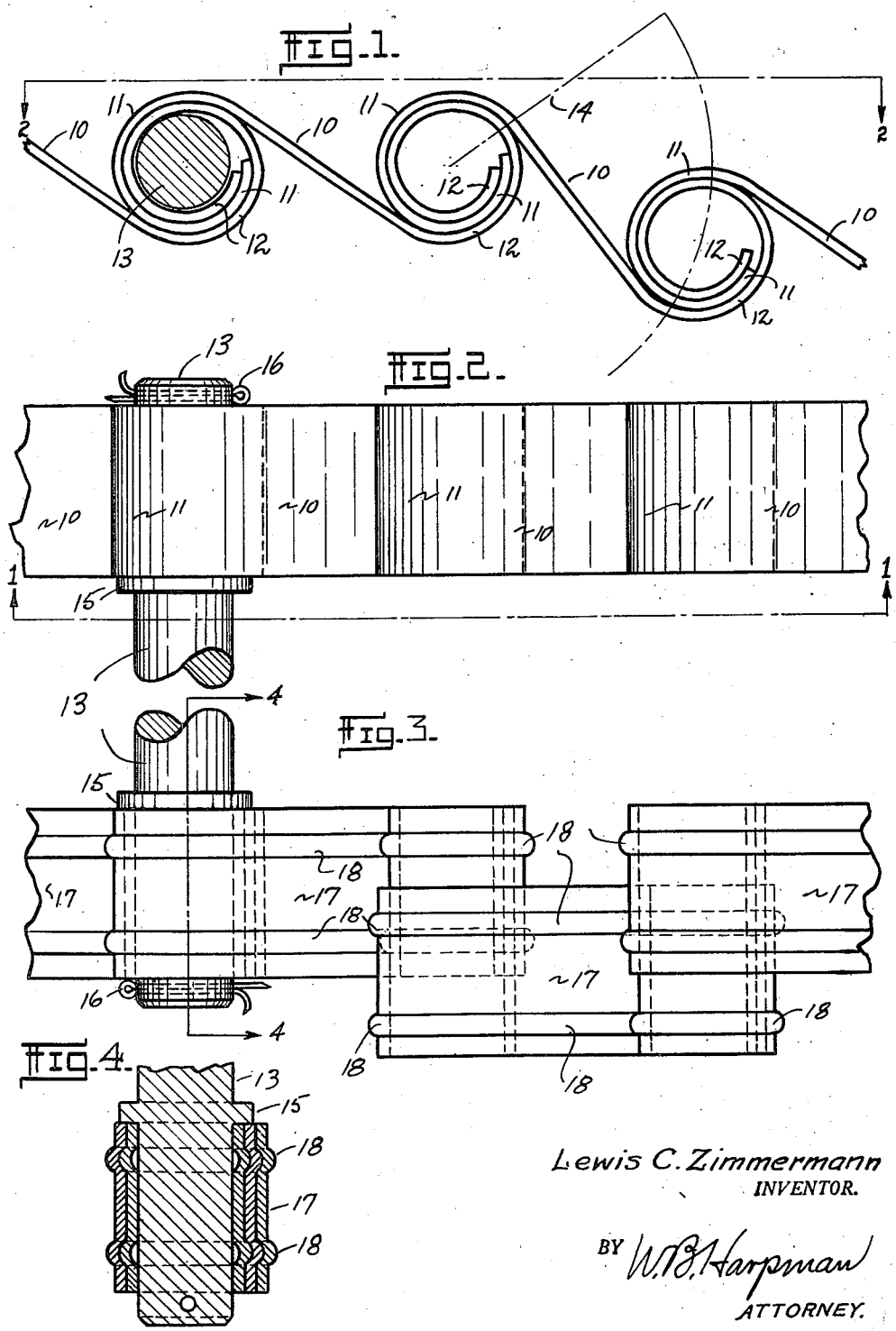
Lewis C. Zimmermann
INVENTOR.
BY W.T.S. Harpman
ATTORNEY.

Patented Nov. 16, 1948

2,454,023

UNITED STATES PATENT OFFICE 2,454,023

CONVEYER

Lewis C. Zimmermann, Youngstown, Ohio

Application March 23, 1945, Serial No. 584,423

1 Claim. (Cl. 198—193)

This invention relates to a conveyor and more particularly to a conveyor link construction.

The principal object of the invention is the provision of a conveyor formed of a plurality of interlocking conveyor links.

A further object of the invention is the provision of a conveyor link having oppositely formed spiral end sections of appropriate size for registry with an adjacent conveyor link.

A still further object of the invention is the provision of a plurality of conveyor links, each of which is provided with means for engaging the other so as to hold the same in alignment or chain-like formation.

A still further object of the invention is the provision of a conveyor formed of a pair of chain-like assemblies of interlocked conveyor links spaced apart and operatively positioned by means of a plurality of appropriately formed rods.

The conveyor link shown and described herein has been designed to facilitate the formation of a continuous chain-like linkage of interconnected conveyor links, each of which links is of simple construction and capable of economic formation. The conveyor link in interconnecting chain pattern may be employed as a link belt for the transmission of power, as a single line conveyor to which articles may be attached and as multiple line conveyors upon which articles may be positioned or suspended, as desired. The conveyor link is provided with integrally formed means facilitating the assembly of a link belt construction so that a plurality of links may be readily assembled into a continuous linkage.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is an enlarged side elevation of a plurality of conveyor links operatively engaging one another.

Figure 2 is a top plan view with parts broken away of the plurality of conveyor links illustrated in Figure 1 and illustrates the manner of forming a multiple line conveyor therefrom.

Figure 3 is a top plan view with parts broken away of a plurality of modified conveyor links illustrating the manner of forming a multiple line conveyor therefrom.

Figure 4 is a cross sectional elevation taken on lines 4—4 of Figure 2.

By referring to the drawings and Figures 1 and 2 in particular it will be observed that a plurality of individually formed conveyor links have been assembled into a chain-like structure. Each of the conveyor links consists of a section of suitable material having oppositely disposed spiral end formations 11 and 12, respectively. Each of the spiral end formations 11 forms a partly closed eyelet and each of the oppositely disposed spiral end formations 12 forms a completely closed eyelet, the spiral end formations 11 each being of a size sufficient to permit the registry thereinto of each of the spiral formations 12 in the manner illustrated in Figure 1. In such assembly the plurality of links 10 form an interconnecting, interlocking chain-like structure which may be advantageously used as a link belt for the transmission of power or as a conveyor belt either in single formation or adjacently positioned pairs of chain-like assemblies spaced from one another and operatively positioned by means of spacing rods such as indicated in Figure 1 by the numeral 13. It will be observed that the interlocking spiral end sections of the interconnected links 10 provide for a considerable degree of flexibility as indicated by the broken lines 14 on Figure 1.

In Figure 2 of the drawings a top plan view of the assembled linkage illustrated in Figure 1 is shown together with an adjacently positioned, partially assembled linkage of slightly modified form. In Figure 2 the several links 10 are shown operatively engaged, as in Figure 1, and supporting the flanged rod 13, the flanges thereof being indicated by the numeral 15 which engage one side of the assembled links 10 and the other end of which is provided with a conventional fastening means such as the cotter key 16 illustrated, it being observed that other fastening or controlling structures may be employed such as threading the end of the rod. In Figure 3 each of a plurality of links 17 is provided with a pair of axially extending ridges 18 which are so formed that upon the links 17 being assembled into chain-like formation the several ridges 18 engage one another with snap-like action so as to lock the several links 17 into chain-like formation. The manner of engagement between the several links 17 is illustrated in the cross sectional elevation comprising Figure 4 wherein the interlocking of the plurality of superimposed ridges 18 in the assembled structure of the links 17 is clearly shown.

In Figure 3 one of the links 17 is shown in assembled position in the row of links 17 and it will be observed that when it is moved into position in alignment with the remaining links 17 it will then engage the adjacent links by means of the plurality of ridges 18 formed on each of the several links. It is obvious that this particular formation of the assembled conveyor requires no guiding or positioning means on the conveyor moving and guiding apparatus (not shown) as the links will remain in assembled relation due to the interengagement therebetween afforded by the plurality of axially extending ridges 18. Still referring to Figure 3 of the drawings it will be observed that the pair of chain-like assemblies illustrated are spaced apart by the flanged rod 13, the flanges 15 thereof serving to position the assembled link chains with respect to inward movement on the rod 13 and the cotter keys 16 or other fastening means, as desired, serving to limit the outward movement of the chain-like link assemblies with respect thereto. In forming a conveyor capable of supporting objects either by placing the same thereon or by extending them therefrom, the multiple chain-like conveyor illustrated in Figures 2 and 3 is particularly advantageous as the double chain-like assemblies of links 10 and 17, respectively, are held in operative and predetermined spaced relation by means of a plurality of the rods 13, which rods 13 provide a convenient means of supporting articles to be carried by a conveyor so formed.

It will be observed that the individual link constructions from which the conveyor is formed are so designed that they can be readily and economically formed of strip material of suitable gauge and that such formation enables the conveyor links to be advantageously employed in the formation of link type conveyors.

It will also be seen that the type of interlocking conveyor linkage illustrated in Figure 3 by the links 17 with the interlocking grooves 18 integrally formed therewith may be used as a single line conveyor without the necessity of providing guides or other means for positioning or locking the moving conveyor link belt so formed, as the interlocking formation of the plurality of links 17 insures the continuous interdependent linkage retaining its assembled form.

It will thus be seen that a relatively simple and efficient conveyor linkage has been disclosed which is formed of a plurality of simple links, each of which may be readily formed of strip stock materials and that the link is capable of many and varied uses in conveying motion power or materials, as desired.

Having thus described my invention, what I claim is:

In a conveyor, an assembly of interconnected conveyor links each of which consists of a straight section of strip stock material having one end formed in an upturned overlapping spiral of decreasing size and the other end formed in a downturned spiral of decreasing size and forming about 315 degrees of a circle, the said downturned spiral being relatively larger than the said upturned spiral and adapted, in said conveyor assembly, to partly overlie the said upturned spiral formation of an adjacent interconnected link and to extend into the said overlapping spiral thereof.

LEWIS C. ZIMMERMANN.

REFERENCES CITED

The following references are of record in the file of this patent:

UNITED STATES PATENTS

| Number | Name | Date |
|---|---|---|
| 880,757 | Rugg | Mar. 3, 1908 |
| 914,437 | Mackey | Mar. 9, 1909 |
| 1,215,183 | Palen et al. | Feb. 6, 1917 |
| 2,258,035 | Sjostrom | Oct. 7, 1941 |